US012621062B2

(12) United States Patent
Yin et al.

(10) Patent No.: US 12,621,062 B2
(45) Date of Patent: May 5, 2026

(54) METHOD AND APPARATUS FOR CALIBRATING SIGNAL, COMMUNICATION DEVICE AND STORAGE MEDIUM

(71) Applicant: Beijing X-Ring Technology Co., Ltd., Beijing (CN)

(72) Inventors: Fan Yin, Shanghai (CN); Wen Qiao, Shanghai (CN); Yiwei Hong, Shanghai (CN); Yu Dong, Shanghai (CN)

(73) Assignee: Beijing X-Ring Technology Co., Ltd., Beijing (CN)

( * ) Notice: Subject to any disclaimer, the term of this patent is extended or adjusted under 35 U.S.C. 154(b) by 44 days.

(21) Appl. No.: 18/429,101

(22) Filed: Jan. 31, 2024

(65) Prior Publication Data

US 2025/0015905 A1      Jan. 9, 2025

(30) Foreign Application Priority Data

Jul. 3, 2023    (CN) .......................... 202310809718.4

(51) Int. Cl.
H04B 17/11       (2015.01)
H04B 1/00        (2006.01)
H04B 17/21       (2015.01)

(52) U.S. Cl.
CPC ........... H04B 17/11 (2015.01); H04B 1/0096 (2013.01); H04B 17/21 (2015.01)

(58) Field of Classification Search
CPC ...... H04B 17/21; H04B 17/11; H04B 1/0096; H04B 1/0017; H04B 1/0007; H04L 25/03891
See application file for complete search history.

(56) References Cited

U.S. PATENT DOCUMENTS

| | | | |
|---|---|---|---|
| 7,099,626 B2 | 8/2006 | Peng et al. | |
| 10,116,485 B1 * | 10/2018 | Liu ........................ | H04B 17/354 |
| 2013/0343490 A1 * | 12/2013 | Wertz ..................... | H04B 17/21 |
| | | | 375/340 |
| 2018/0159640 A1 * | 6/2018 | Taher ................... | H04B 17/364 |
| 2021/0281326 A1 * | 9/2021 | Hu ..................... | H04B 10/6911 |
| 2022/0045713 A1 * | 2/2022 | Muhammad ......... | H04B 1/0475 |
| 2025/0112806 A1 * | 4/2025 | Mobin ................... | H04B 17/21 |

OTHER PUBLICATIONS

European Patent Application No. 24156035.8, Search and Opinion dated Aug. 5, 2024, 8 pages.

* cited by examiner

*Primary Examiner* — Aristocratis Fotakis
(74) *Attorney, Agent, or Firm* — Cozen O'Connor

(57) ABSTRACT

In a method for calibrating a signal, a calibration parameter corresponding to a signal having a preset bandwidth is obtained and a calibrated signal is obtained by calibrating, based on a frequency of a signal to be calibrated and the calibration parameter, the signal to be calibrated.

14 Claims, 7 Drawing Sheets

201 generate a calibration parameter corresponding to a signal having a preset bandwidth

202 obtain a calibrated signal by calibrating, based on a frequency of a signal to be calibrated and the calibration parameter, the signal to be calibrated

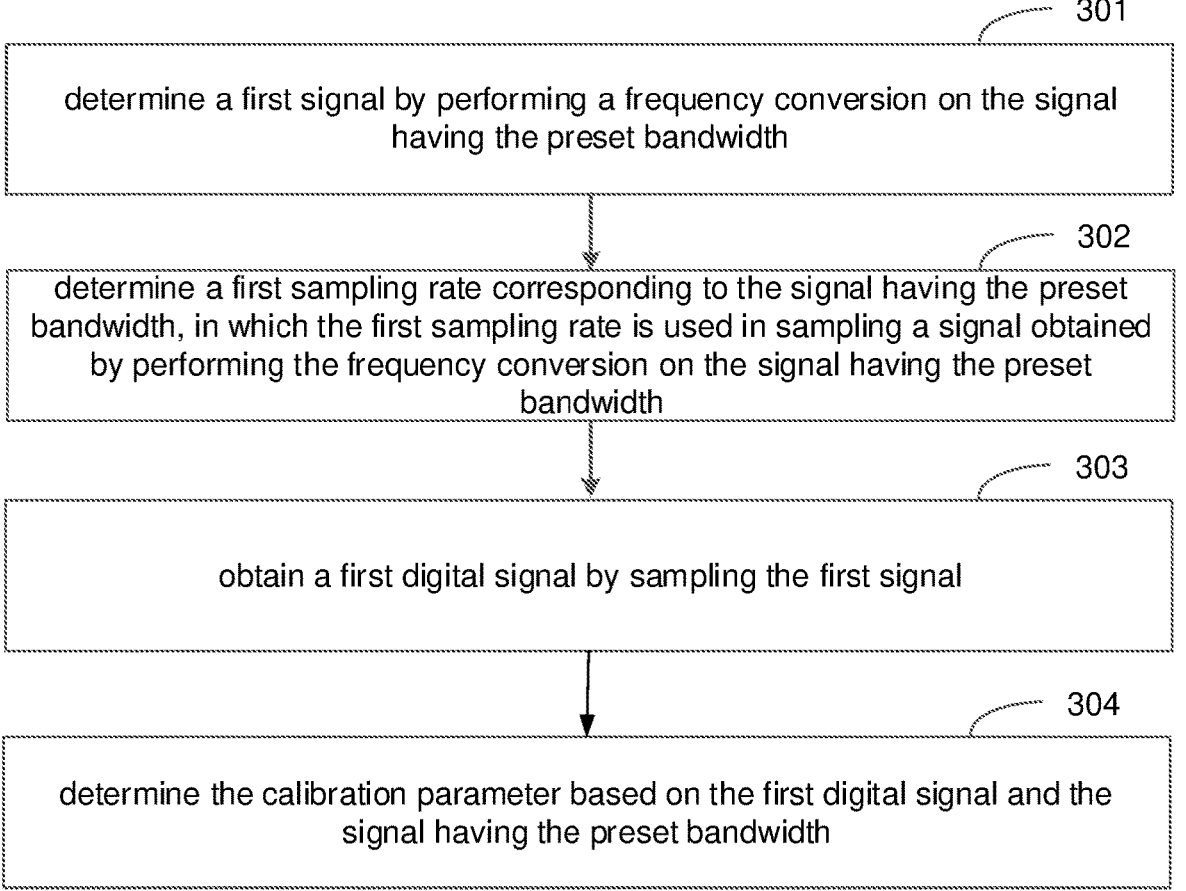

301 determine a first signal by performing a frequency conversion on the signal having the preset bandwidth

302 determine a first sampling rate corresponding to the signal having the preset bandwidth, in which the first sampling rate is used in sampling a signal obtained by performing the frequency conversion on the signal having the preset bandwidth

303 obtain a first digital signal by sampling the first signal

304 determine the calibration parameter based on the first digital signal and the signal having the preset bandwidth

FIG. 3

601 obtain the calibrated signal by calibrating, using the calibration parameter and a frequency deviation between the first frequency and the frequency of the signal to be calibrated, the signal to be calibrated

FIG. 6

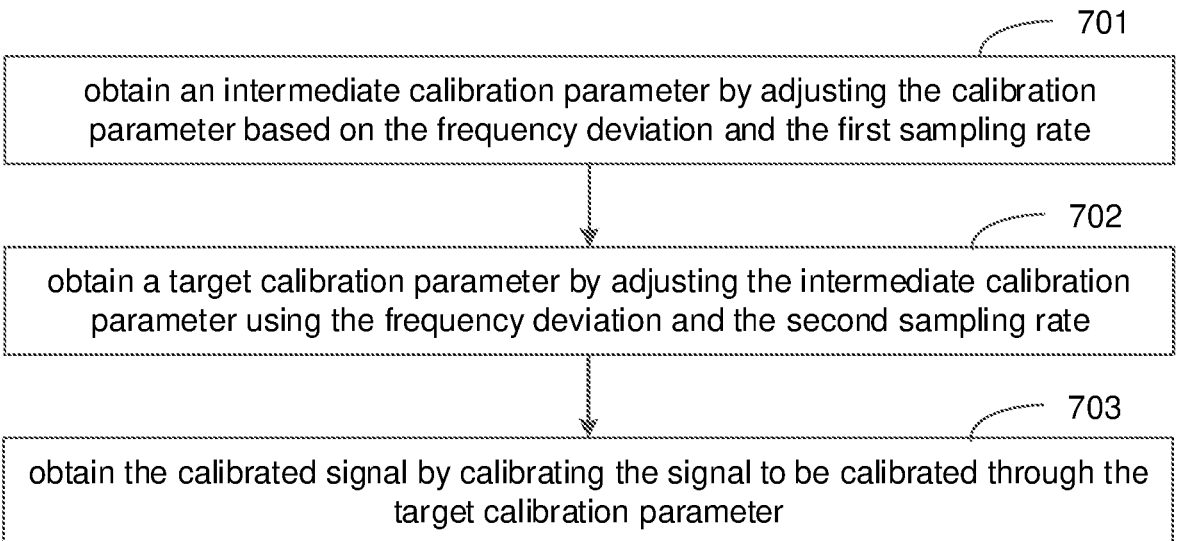

701 obtain an intermediate calibration parameter by adjusting the calibration parameter based on the frequency deviation and the first sampling rate

702 obtain a target calibration parameter by adjusting the intermediate calibration parameter using the frequency deviation and the second sampling rate

703 obtain the calibrated signal by calibrating the signal to be calibrated through the target calibration parameter

FIG. 7 apparatus 1100 for calibrating a signal

~1101 calibration parameter generating module

~1102 signal calibrating module

METHOD AND APPARATUS FOR CALIBRATING SIGNAL, COMMUNICATION DEVICE AND STORAGE MEDIUM

CROSS REFERENCE TO RELATED APPLICATIONS

This application claims priority and benefits to Chinese Application No. 202310809718.4, filed on Jul. 3, 2023, the entire content of which is incorporated herein by reference.

TECHNICAL FIELD

The disclosure relates to a wireless communication field, in particular to a method for calibrating a signal, an apparatus for calibrating a signal, a communication device, a storage medium, and a chip.

BACKGROUND

Transmission of a wideband signal in a radio frequency (RF) communication circuit may create an edge roll-off effect. When high-frequency components of a signal are attenuated, envelope broadening of the signal may lead to Inter Symbol Interference (ISI). There are many factors that may cause the ISI of signal, and the main factor is channel multipath effect.

SUMMARY

In a first aspect, embodiments of the disclosure provide a method for calibrating a signal. The method includes: generating a calibration parameter corresponding to a signal having a preset bandwidth; and obtaining a calibrated signal by calibrating, based on a frequency of the signal to be calibrated and the calibration parameter, a signal to be calibrated.

In a second aspect, embodiments of the disclosure provide an electronic device. The electronic device includes a processor and a memory having instructions stored thereon. When the instructions are executed by the processor, the method of the embodiments of the first aspect is performed.

In a third aspect, embodiments of the disclosure provide a non-transitory computer-readable storage medium, having computer instructions stored thereon. The computer instructions are configured to cause a computer to perform the method of the embodiments of the first aspect.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure and do not constitute an undue limit of this disclosure.

FIG. 3 is a flowchart illustrating a method for calibrating a signal according to an embodiment of the disclosure.

FIG. 6 is a flowchart illustrating a method for calibrating a signal according to an embodiment of the disclosure.

FIG. 7 is a flowchart illustrating a method for calibrating a signal according to an embodiment of the disclosure.

DETAILED DESCRIPTION

Figure 1:
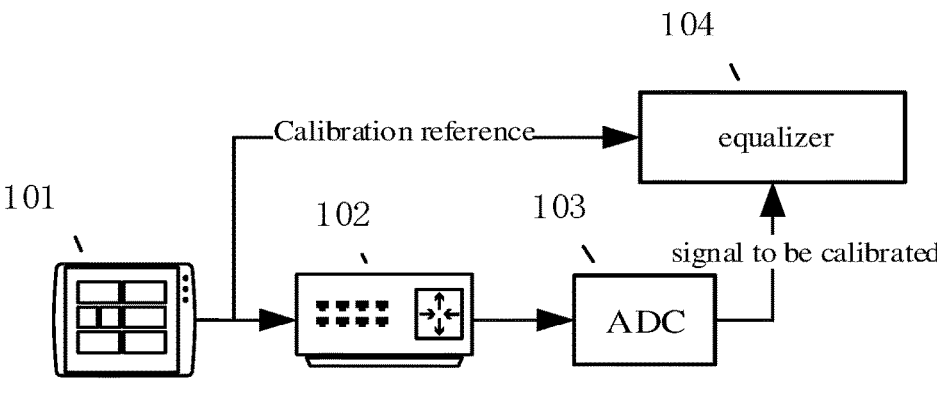
FIG. 1 is a schematic diagram illustrating an equalization architecture according an embodiment of the disclosure.

Embodiments of the disclosure are described in detail below, examples of which are shown in the accompanying drawings, in which the same or similar numbers represent the same or similar elements or elements with the same or similar functions. Embodiments described below with reference to the drawings are intended to explain the disclosure, and should not be construed as limiting the disclosure.

Embodiments of the disclosure are non-exhaustive, and are only illustrations of some embodiments, and do not serve as a specific limitation on the protection scope of the disclosure. Without contradiction, each step in a certain embodiment can be implemented as an independent embodiment, and the steps can be combined with each other arbitrarily. For example, the solution after removing some of the steps in a certain embodiment may also be implemented as an independent embodiment, and the order of steps in a certain embodiment may be exchanged arbitrarily. Moreover, the implementations in a certain embodiment may be combined arbitrarily. In addition, embodiments may be arbitrarily combined with each other. For example, some or all of the steps of different embodiments may be arbitrarily combined, and a certain embodiment may be arbitrarily combined with implementations of other embodiments.

In each of embodiments of the disclosure, the terms and/or descriptions in embodiments are consistent and can be referred to each other if there are no special instructions and logical conflicts, and technical features in different embodiments can be combined to create a new embodiment based on their intrinsic logical relations.

The terms used in embodiments of the disclosure are used only for the purpose of describing a particular embodiment, and are not intended as a limitation of the disclosure.

In embodiments of the disclosure, unless otherwise specified, elements expressed in the singular form, such as "one," "a," "the," "the above," "said," "the aforementioned," "the foregoing," "this," etc., can mean "one and only", and can also mean "one or more" or "at least one". For example, when articles such as "a," "an" and "the" are used in translation, the noun following the article can be understood as either a singular form or a plural form.

In embodiments of the disclosure, "a plurality of" means two or more.

In some embodiments, the device may be interpreted as physical or virtual, and the name thereof is not limited to the names recited in embodiments, and the names "device," "equipment," "circuit," "network element," "node," "function," "unit," "component," "system," "network," "chip," "chip system," "entity," "subject," etc. are interchangeable.

In the related art, Inter Symbol Interference (ISI) is mainly caused by channel multipath effect or characteristics of radio frequency (RF) components. The ISI caused by the channel multipath effect can be tackled by means of channel equalization, diversity techniques, or channel coding, while the ISI caused by the undesirable characteristics of the RF communication circuit is generally solved by channel equalization.

In other words, components included in the RF communication circuit are not ideal components, and an equalization processing needs to be performed on the output signal, i.e., the output signal needs to be equalized. In the disclosure, the equalization processing can be understood as a calibration processing.

FIG. 1 is a schematic diagram illustrating a signal equalization architecture 100 in the related art.

The equalization architecture 100 includes a signal source 101, a RF communication circuit 102, an Analog-to-Digital Converter (ADC) 103, and an equalizer 104.

The signal source 101 is configured to generate a source signal, which may include a reference signal. The RF communication circuit 102 may receive the reference signal generated by the signal source 101 and may perform a frequency conversion on the reference signal to output a corresponding signal. The corresponding signal output by the RF communication circuit 102 may be modulated to the ADC 103 for analog-to-digital conversion, to obtain a corresponding digital signal. The equalizer 104 may calculate and obtain a calibration parameter (or called equalization parameter) based on the corresponding digital signal and the reference signal.

The equalization architecture 100 may calibrate, using calibration parameter, an operating signal corresponding to a bandwidth of the reference signal.

However, in a wireless communication service, the signal carrier frequency and the bandwidth of the RF communication circuit are determined by the type of the communication service. As a result, a separate set of calibration parameters needs to be generated for each type of service, and the calibration parameters may occupy too much storage space.

Figure 2:
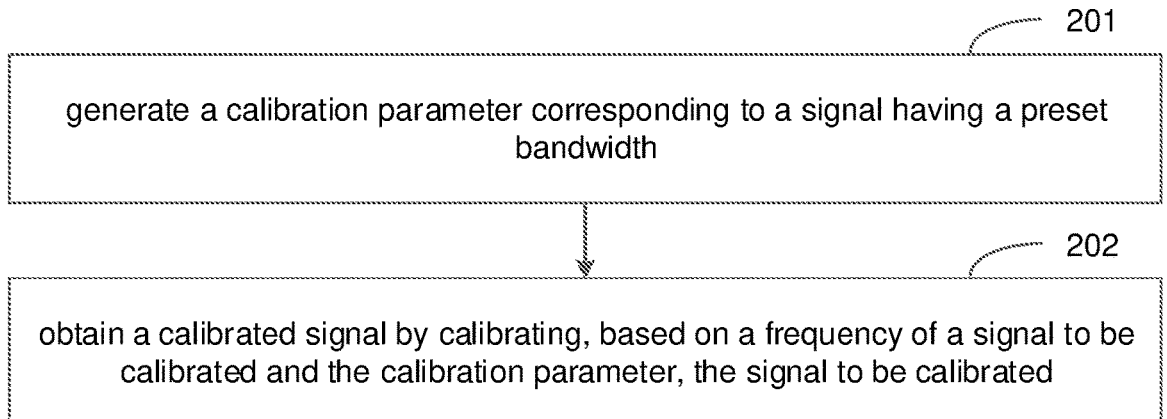
FIG. 2 is a flowchart illustrating a method for calibrating a signal according to an embodiment of the disclosure.

FIG. 2 is a flowchart illustrating a method for calibrating a signal according to an embodiment of the disclosure.

At block 201, a calibration parameter corresponding to a signal having a preset bandwidth is generated.

The method according to embodiments of FIG. 2 may be performed by a terminal, which may be selected from a group including a cell phone, a tablet computer or other electronic devices. Or, the method according to embodiments of FIG. 2 may be performed by a chip, which may be a System on Chip (SOC) chip or other processing chips. Or, the method according to embodiments of FIG. 2 may be performed by a network device, which may be selected from a group including a base station or a satellite, which is not limited in the disclosure.

The method according to embodiments of FIG. 2 may be performed by a transmitting device or a receiving device, which is not limited in the disclosure.

The above-mentioned method executed by a terminal is described below as an example in the disclosure.

In an embodiment of the disclosure, the calibration parameter corresponding to the signal having the preset bandwidth may be obtained by the terminal through a training process. For example, the terminal may include a RF communication circuit, an ADC, and an equalizer. The RF communication circuit may receive the signal having the preset bandwidth and perform the frequency conversion on the signal having the preset bandwidth to obtain a corresponding output signal. The terminal may modulate the output signal by means of a frequency mixer or other modulation devices to the ADC. The ADC performs an analog-to-digital conversion on the output signal, to obtain a digital signal. The equalizer may determine the calibration parameter based on the signal having the preset bandwidth and the digital signal. In this embodiment, the signal having the preset bandwidth, as a reference signal known to both the input side and the output side, is used for determining its corresponding calibration parameter. The above-mentioned input side is the signal source side and the above-mentioned output side is the equalizer.

In an embodiment of the disclosure, the above-mentioned RF communication circuit may perform the frequency conversion on the signal having the preset bandwidth based on a reception or transmission condition of the signal having the preset bandwidth, to obtain a corresponding output signal. For example, when the signal having the preset bandwidth is a transmitting signal, an up conversion is performed, with a first frequency, on the signal having the preset bandwidth. When the signal having the preset bandwidth is a receiving signal, a down conversion is performed, with a first frequency, on the signal having the preset bandwidth. The first frequency is a carrier frequency of the output frequency-converted signal obtained by performing the frequency conversion on the signal having the preset bandwidth.

In an embodiment of the disclosure, the above-mentioned ADC may sample the above-mentioned output signal at a first sampling rate, to obtain a corresponding digital signal. In embodiments of the disclosure, the first sampling rate is associated with the preset bandwidth. For example, the relation between the first sampling rate and the preset bandwidth satisfies a sampling theory. For example, the first sampling rate is greater than or equal to twice the preset bandwidth. For example, if the bandwidth of the signal is 200 Hz, the sampling frequency must be greater than 400 Hz to avoid aliasing.

In another embodiment of the disclosure, the calibration parameter of the signal having the preset bandwidth may be read from a memory. For example, the terminal may obtain the signal having the preset bandwidth after the training process using the above method and store the signal having the preset bandwidth into the memory. For example, the calibration parameter corresponding to the signal having the preset bandwidth is stored in the memory by means of a pre-configuration manner, which allows the terminal to read from the memory when needed.

In another embodiment of the disclosure, the preset bandwidth satisfies one of the following conditions:

the preset bandwidth including 400 Mhz; the preset bandwidth including 200 Mhz; the preset bandwidth occupying an entire used frequency band; or the preset bandwidth being greater than 200 Mhz and less than 400 Mhz.

At block 202, a calibrated signal is obtained by calibrating, based on a frequency of a signal to be calibrated and the calibration parameter, the signal to be calibrated.

In an embodiment of the disclosure, the terminal may pre-establish a correspondence between the frequency of the signal to be calibrated and the calibration parameter corresponding to the signal having the preset bandwidth, obtain a target calibration parameter by adjusting the calibration parameter based on the preset correspondence, and calibrate the signal to be calibrated through the target calibration parameter.

In an embodiment of the disclosure, the terminal may obtain a first frequency corresponding to the signal having the preset bandwidth. The first frequency is used for tuning the frequency of the signal having the preset bandwidth. The terminal may calibrate the signal to be calibrated based on the first frequency, the frequency of the signal to be calibrated and the calibration parameter, to obtain the calibrated signal. For example, the terminal may determine a frequency deviation between the first frequency and the frequency of the signal to be calibrated, obtain the target calibration parameter by adjusting the calibration parameter using the frequency deviation, and obtain the calibrated signal by calibrating the signal to be calibrated using the target calibration parameter.

In an embodiment of the disclosure, the terminal may obtain the first frequency and the first sampling rate corresponding to the signal having the preset bandwidth. The first frequency is used for tuning the frequency of the signal having the preset bandwidth, and the first sampling rate is used for sampling a corresponding signal obtained by tuning, with the first frequency, the frequency of the signal having the preset bandwidth.

For example, the terminal obtains the calibrated signal by calibrating, using the frequency deviation between the first frequency and the frequency of the signal to be calibrated, the first sampling rate, a second sampling rate and the calibration parameter, the signal to be calibrated. The second sampling rate corresponds to the signal to be calibrated.

For example, the terminal obtains an intermediate calibration parameter by adjusting, based on the frequency deviation and the first sampling rate, the calibration parameter, obtain a target calibration parameter by adjusting, using the frequency deviation and the second sampling rate, the intermediate calibration parameter, and obtain the calibrated signal by calibrating, using the target calibration parameter, the signal to be calibrated.

In an embodiment of the disclosure, the terminal obtains the calibrated signal through the following ways. The terminal obtains a second signal and obtains a second sub-signal by performing a frequency conversion on the second signal, obtains a second processed signal by performing, using a frequency mixer, a frequency mixing operation on the second sub-signal, and obtains the signal to be calibrated by sampling the second processed signal at the second sampling rate. The second signal has a bandwidth less than or equal to the preset bandwidth.

For example, the above-mentioned second sampling rate is a sampling rate corresponding to the second signal. For example, the second sampling rate is greater than or equal to twice the bandwidth of the second signal.

With the method for calibrating a signal according to the disclosure, the calibration parameter corresponding to the signal having a preset bandwidth is obtained and the calibrated signal is obtained by calibrating, based on the frequency of the signal to be calibrated and the calibration parameter, the signal to be calibrated. The solution of the disclosure can use the generated calibration parameter to calibrate different signals to be calibrated, thereby avoiding dynamic adaptation while realizing dimension reduction of parameter storage.

FIG. 3 is a flowchart illustrating a method for calibrating a signal according to an embodiment of the disclosure.

At block 301, a first signal is determined by performing a frequency conversion on the signal having the preset bandwidth.

In some embodiments of the disclosure, the terminal determines the first signal by performing the frequency conversion on the signal having the preset bandwidth, to further determine the first digital signal.

In some embodiments of the disclosure, the preset bandwidth satisfies one of the following conditions: the preset bandwidth including 400 Mhz; the preset bandwidth including 200 Mhz; the preset bandwidth occupying an entire used frequency band; or the preset bandwidth being greater than 200 Mhz and less than 400 Mhz.

In some embodiments of the disclosure, the signal having the preset bandwidth may be a signal or a signal stream formed by a plurality of signals, which is not limited in the disclosure.

In some embodiments of the disclosure, the first signal is a signal obtained by performing the frequency conversion on the signal having the preset bandwidth. The first signal is an analog signal.

In some embodiments of the disclosure, the signal having the preset bandwidth may be a digital signal or an analog signal, which is not limited in the disclosure.

In some embodiments of the disclosure, the signal having the preset bandwidth may be converted from a digital signal to an analog signal by a device such as the signal source, and the frequency conversion may be performed on the converted signal having a preset bandwidth.

In some embodiments of the disclosure, the signal having the preset bandwidth is a signal that occupies the entire used frequency bandwidth of the terminal, and the signal having the preset bandwidth covers the maximum input bandwidth of the RF communication circuit. In some examples, the signal having the preset bandwidth may be a reference signal sent by the signal source.

In some embodiments of the disclosure, there is only one signal having a preset bandwidth within a same frequency band. That is, a respective signal having the preset bandwidth is unique for each frequency band. For example, if the operating signal of the RF communication circuit is a signal having a bandwidth ranging from 5 MHz to 100 MHz modulated within a frequency range of 2300 MHz to 2400 MHz, the signal having the preset bandwidth used for determining the calibration parameter of the RF communication circuit is a wideband signal having a bandwidth of 100 MHz modulated at 2350 MHz.

Figure 4:
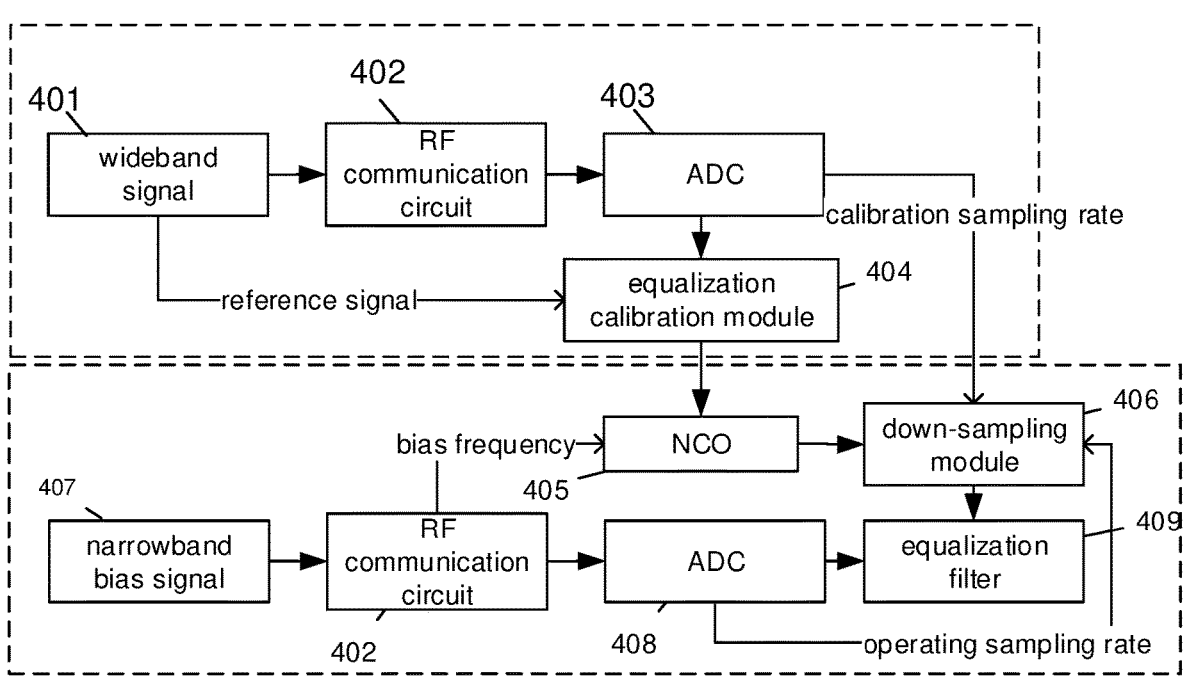
FIG. 4 is a schematic diagram illustrating an equalizer architecture according to an embodiment of the disclosure.

FIG. 4 is a schematic diagram illustrating a signal equalizer architecture according to an embodiment of the disclosure. The signal having the preset bandwidth may be a wideband signal 401. The terminal may input the wideband signal into the RF communication circuit 402 for performing the frequency conversion on the wideband signal, to determine the first signal.

At block 302, a first sampling rate corresponding to the signal having the preset bandwidth is determined, in which the first sampling rate is used for sampling a frequency-converted signal obtained by performing the frequency conversion on the signal having the preset bandwidth.

In some embodiments of the disclosure, the terminal may determine the first sampling rate corresponding to the signal having the preset bandwidth and sample the signal having the preset bandwidth at the first sampling rate.

In some embodiments of the disclosure, the first sampling rate may also be used for sampling the frequency-converted signal obtained by performing the frequency conversion on the signal having the preset bandwidth.

In some embodiments of the disclosure, a correspondence between the signal having the preset bandwidth and the first sampling rate may be pre-configured. The first sampling rate corresponding to the signal having the preset bandwidth may be determined by a preset table, and the method of determining the first sampling rate is not limited in the disclosure.

In some embodiments of the disclosure, the correspondence between the signal having the preset bandwidth and the first sampling rate is not limited, i.e., the first sampling rates corresponding to different signals having the preset bandwidth may be the same or different.

In some embodiments of the disclosure, the first sampling rate should satisfy the Nyquist Sampling Theory. That is, the first sampling rate should be greater than or equal to twice the maximum frequency of the signal having the preset bandwidth, to ensure that no signal aliasing occurs when sampling the signal having the preset bandwidth.

At block 303, a first digital signal is obtained by sampling the first signal.

In some embodiments of the disclosure, the terminal obtains the first digital signal by sampling the first signal, for determining the calibration parameter.

In some embodiments of the disclosure, the first signal may be sampled at the first sampling rate, to obtain the first digital signal.

In some embodiments of the disclosure, the first signal is a continuous signal that needs to be discretely sampled and converted into a digital baseband signal, i.e., the first digital signal.

In some embodiments of the disclosure, the first digital signal can be determined based on the following equation:

$$y_{cal}(n) = \left\{ \left[ x_{cal}(n) e^{j2\pi f_0 n / f_{s0}} \right] * g(n) \right\} e^{-j2\pi f_0 n / f_{s0}} \quad (3.1)$$

in which, $x_{cal}(n)$ represents a discrete signal of the signal having the preset bandwidth, $f_0$ represents a frequency of the frequency conversion, $f_{s0}$ represents the first sampling rate, and $y_{cal}(n)$ represents the first digital signal.

For example, in FIG. 4, the RF communication circuit 402 may input the first signal to the ADC 403 for sampling, converting the first signal from a continuous signal to a discrete signal to obtain the first digital signal.

At block 304, the calibration parameter is determined based on the first digital signal and the signal having the preset bandwidth.

In some embodiments of the disclosure, the terminal may determine the calibration parameter based on the first digital signal and the signal having the preset bandwidth, to calibrate the signal to be calibrated.

In some embodiments of the disclosure, the calibration parameter is determined based on the first digital signal and the signal having the preset bandwidth that occupies the entire used frequency bandwidth of the terminal, so that the calibration parameter may be used for calibrating any signal to be calibrated within the used frequency band.

In some embodiments of the disclosure, one frequency band has only one determined calibration parameter, i.e., the calibration parameter is adapted to all signals having different bandwidths and rates within the frequency band. For example, the calibration parameter generated in the frequency band from 2300 MHz to 2400 MHz can be adapted to a signal to be calibrated having a bandwidth of 10 MHz modulated at 2350 MHz or a signal to be calibrated having a bandwidth of 50 MHz modulated at 2330 MHz.

In some embodiments of the disclosure, a method such as zero forcing, minimum mean square error, or the like may be used for determining the calibration parameter, and the method for determining the calibration parameter is not limited in the disclosure. Any method for determining the calibration parameter based on the first digital signal and the signal having the preset bandwidth falls within the scope of the disclosure.

In some embodiments of the disclosure, the calibration parameter should satisfy the following equation:

$$y_{cal}(n) * h(n) = \left\{ \left[ x_{cal}(n) e^{j2\pi f_0 n / f_{s0}} \right] * g(n) e^{-j2\pi f_0 n / f_{s0}} \right\} * h(n) \approx x_{cal}(n) \quad (3.2)$$

in which h(n) represents the calibration parameter, and definitions of the rest parameters can be referred to the relevant descriptions in Eq. (3.1) above, which are not repeated here.

In some embodiments of the disclosure, there is only one first input signal for one frequency band, and thus there is only one first calibration parameter generated for that frequency band.

For example, in FIG. 4, an equalization calibration module 404 may receive the wideband signal and the first digital signal sent by the ADC, and determine the calibration parameter through a method such as zero forcing, minimum mean square error, or the like.

It is understandable that the method for calibrating a signal according to embodiments of the disclosure may include at least one of blocks 301 to 304. For example, the block 301 may be implemented as a stand-alone embodiment, or the block 303 may be implemented as a stand-alone embodiment, which is not used to limit the disclosure.

In some embodiments, the block 302 is optional, and this block can be omitted or substituted in different embodiments.

In this implementation or embodiment, the blocks may be implemented independently, exchangeably, or in any combination, and the implementations or embodiments may be implemented in any combination or may be implemented in combination with other implementations or embodiments, without conflict.

With the method for calibrating a signal according to the disclosure, the first signal is determined by performing the frequency conversion on the signal having the preset bandwidth; the first sampling rate corresponding to the signal having the preset bandwidth is obtained, in which the first sampling rate is used for sampling the first signal determined by performing the frequency conversion on the signal having the preset bandwidth; the first digital signal is obtained by sampling the first signal; and the calibration parameter is determined based on the first digital signal and the signal having the preset bandwidth. The solution of the disclosure determines the calibration parameter based on the first digital signal and the signal having the preset bandwidth that occupies the entire used frequency bandwidth of the terminal, so that the generated calibration parameter can be used for calibrating any signal to be calibrated within the same used frequency band, thereby avoiding dynamic adaptation while realizing dimension reduction of parameter storage.

Figure 5:
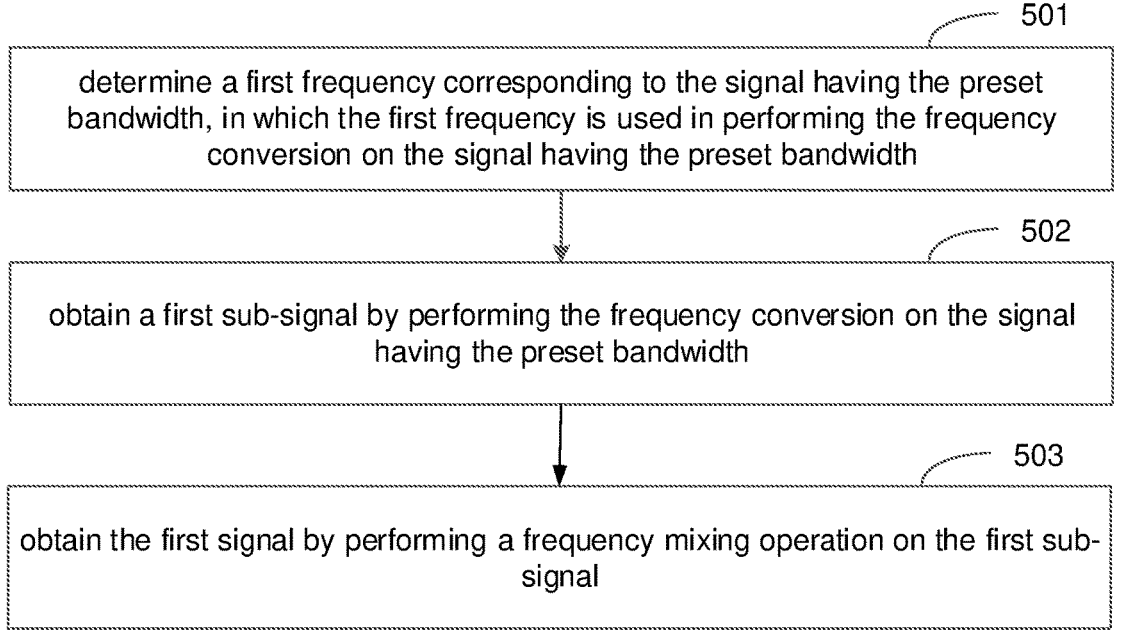
FIG. 5 is a flowchart illustrating a method for calibrating a signal according to an embodiment of the disclosure.

FIG. 5 is a flowchart illustrating a method for calibrating a signal according to an embodiment of the disclosure.

At block 501, a first frequency corresponding to the signal having the preset bandwidth is determined, in which the first frequency is used in performing the frequency conversion on the signal having the preset bandwidth.

In some embodiments of the disclosure, the terminal determines the first frequency corresponding to the signal having the preset bandwidth, in which the first frequency is used in performing the frequency conversion on the signal having the preset bandwidth.

In some embodiments of the disclosure, a correspondence between the signal having the preset bandwidth and the first frequency may be pre-configured. For example, the first frequency corresponding to the signal having the preset bandwidth may be determined by a preset table, and the method for determining the first frequency is not limited in the disclosure.

In some embodiments of the disclosure, the correspondence between the signal having the preset bandwidth and the first frequency is not limited, the first frequencies corresponding to different signals having the preset bandwidth may be the same or different.

At block 502, a first sub-signal is obtained by performing the frequency conversion om the signal having the preset bandwidth.

In some embodiments of the disclosure, the terminal may obtain the first sub-signal by performing the frequency conversion on the signal having the preset bandwidth, to determine the first signal.

In some embodiments of the disclosure, when the signal having the preset bandwidth is a transmitting signal, an up conversion is performed, with a first frequency, on the signal having the preset bandwidth.

In some embodiments of the disclosure, when the signal having the preset bandwidth is a receiving signal, a down conversion is performed, with a first frequency, on the signal having the preset bandwidth.

In an embodiment, the signal having the preset bandwidth is represented by $x_{cal}(t)$, the first sub-signal is $x_{cal}(t)e^{j2\pi f_0 t}$, in which $f_0$ denotes the first frequency, and $f_0$ is positive when the up conversion is performed on the signal having the preset bandwidth, and $f_0$ is negative when the down conversion is performed on the signal having the preset bandwidth.

At block 503, the first signal is obtained by performing a frequency mixing operation on the first sub-signal.

In some embodiments of the disclosure, the terminal may perform the frequency mixing operation on the first sub-signal to obtain the first signal.

In some embodiments of the disclosure, the unevenness of the RF communication circuit and the inter-code crosstalk during signal transmission may create a certain degree of distortion in the first signal obtained after the frequency mixing operation. The first signal may also be a distorted signal obtained by performing the frequency conversion and the frequency mixing operation on the signal having the preset bandwidth.

In some embodiments of the disclosure, the first signal obtained by performing the frequency mixing operation can be determined by the following equation:

$$y_{cal}(t) = \{[x_{cal}(t)\exp(j2\pi f_0 t)] * g(t)\}\exp(-j2\pi f_0 t) \quad (5.1)$$

in which, g(t) denotes a system response of a communication circuit to be calibrated, and "*" represents a convolution operation. In embodiments of the disclosure, g(t) is an expression abstracted from the RF communication circuit model through which the signal having the preset bandwidth passes, and its specific form does not affect the determination of the calibration parameter. Definitions of the rest parameters can be described with reference to the above equations and will not be repeated herein.

For example, as illustrated in FIG. 4, the signal having the preset bandwidth may be a wideband signal 401. The terminal may input a narrowband bias signal into the RF communication circuit 402 to determine the first sampling rate and perform the frequency conversion and the frequency mixing operation on the wideband signal to obtain the first signal.

It is understandable that the method for calibrating a signal according to embodiments of the disclosure may include at least one of blocks 501 to 503. For example, the block 501 may be implemented as a stand-alone embodiment, or the block 503 may be implemented as a stand-alone embodiment, which is not limited herein.

In some embodiments, the block 501 is optional, and this block may be omitted or substituted in different embodiments.

In this implementation or embodiment, the steps may be implemented independently, exchangeably, or in any combination, and the implementations or embodiments may be implemented in any combination or may be implemented in combination with other implementations or embodiments, without conflict.

With the method for calibrating a signal according to the disclosure, the first frequency corresponding to the signal having the preset bandwidth is determined, in which the first frequency is used in performing the frequency conversion on the signal having the preset bandwidth; the first sub-signal is obtained by performing the frequency conversion on the signal having the preset bandwidth; and the first signal is obtained by performing the frequency mixing operation on the first sub-signal. The solution of the disclosure provides a basis for determining the calibration parameter.

FIG. 6 is a flowchart illustrating a method for calibrating a signal according to an embodiment of the disclosure.

At block 601, the calibrated signal is obtained by calibrating, using the calibration parameter and a frequency deviation between the first frequency and the frequency of the signal to be calibrated, the signal to be calibrated.

In some embodiments of the disclosure, the terminal obtains the calibrated signal by calibrating, using the calibration parameter and the frequency deviation between the first frequency and the frequency of the signal to be calibrated, the signal to be calibrated.

In some embodiments of the disclosure, the frequency deviation between the first frequency and the frequency of the signal to be calibrated is a difference between the first frequency and a frequency of the frequency conversion performed on the signal to be calibrated.

In detail, in some embodiments of the disclosure, the terminal obtains the calibrated signal by calibrating the signal to be calibrated using the frequency deviation between the first frequency and the frequency of the signal to be calibrated, the first sampling rate, the second sampling rate and the calibration parameter. The second sampling rate corresponds to the signal to be calibrated.

With the method for calibrating a signal according to the disclosure, the calibrated signal is obtained by calibrating the signal to be calibrated using the frequency deviation between the first frequency and the frequency of the signal to be calibrated and the calibration parameter. In the solution of the disclosure, the calibrated signal is determined by calibrating the signal to be calibrated using the frequency deviation between the first frequency and the frequency of the signal to be calibrated and the calibration parameter.

FIG. 7 is a flowchart illustrating a method for calibrating a signal according to an embodiment of the disclosure.

At block 701, an intermediate calibration parameter is obtained by adjusting, based on the frequency deviation and the first sampling rate, the calibration parameter.

In some embodiments of the disclosure, the terminal can adjust the calibration parameter based on the frequency deviation and the first sampling rate to obtain the intermediate calibration parameter, which lays the foundation for determining the target calibration parameter.

In some embodiments of the disclosure, the frequency of the signal to be calibrated may be different from the first frequency, so that the signal cannot be directly calibrated using the calibration parameter, and it is necessary to adjust the calibration parameter to obtain the intermediate calibration parameter.

In some embodiments of the disclosure, the frequency deviation may include at least one of: a difference between the first frequency and the frequency of the signal to be calibrated; a ratio of the first frequency to the frequency of the signal to be calibrated; a numerical relation between the difference and the first frequency; or a numerical relation between the difference and the frequency of the signal to be calibrated.

In an embodiment of the disclosure, the frequency deviation can be determined by the following equation:

$$\Delta f = f_0 - f_1 \quad (7.1)$$

in which $\Delta f$ represents the frequency deviation between the frequency of the first output signal and the frequency of the signal to be calibrated, $f_0$ represents the first frequency, and $f_1$ represents the frequency of the signal to be calibrated.

In detail, in some embodiments of the disclosure, the intermediate calibration parameter can be determined by the following equation:

$$h'(n) = h(n)e^{j2\pi\Delta fn/f_{s0}} \quad (7.2)$$

in which h'(n) represents the intermediate calibration parameter, i.e., an equalization parameter obtained by performing a bias frequency shifting on a calibration parameter h(n). Definitions of rest parameters may be referred to the relevant descriptions of the above equations and will not be repeated herein.

For example, as illustrated in FIG. 4, the calibration parameter and the frequency deviation determined by the RF communication circuit 402 are input into a numerical controlled oscillation (NCO) 405, to determine the intermediate calibration parameter.

At block 702, a target calibration parameter is obtained by adjusting, using the frequency deviation and the second sampling rate, the intermediate calibration parameter.

In some embodiments of the disclosure, the terminal may adjust the intermediate calibration parameter using the frequency deviation and the second sampling rate, to obtain the target calibration parameter, so as to realize the calibration of the signal to be calibrated.

In some embodiments of the disclosure, the target calibration parameter can be determined by the following equation:

$$h''(n) = h_{f_{s1}}(n)e^{j2\pi\Delta fn/f_{s1}} \quad (7.3)$$

in which, h''(n) represents the target calibration parameter, $h_{f_{s1}}$ represents a sampling parameter obtained by down sampling after converting the sampling ratio of the intermediate calibration parameter from the first sampling ratio $f_{s0}$ to the second sampling rate $f_{s1}$. Definitions of rest parameters may be described with reference to the above equations, and will not be repeated herein.

For example, as illustrated in FIG. 4, the intermediate calibration parameter obtained by adjusting the calibration parameter using the NCO is input into a down sampling module 406, and the down sampling module 406 converts the sampling rate of the intermediate calibration parameter from the first sampling ratio $f_{s0}$ to the second sampling ratio $f_{s1}$ to generate a sampling parameter $h_{f_{s1}}$, and generates the target calibration parameter based on the sampling parameter hfs1, to tailor the calibration parameter.

At block 703, the calibrated signal is obtained by calibrating the signal to be calibrated using the target calibration parameter.

In some embodiments of the disclosure, the terminal can calibrate the signal to be calibrated using the target calibration parameter to obtain the calibrated signal.

In some embodiments of the disclosure, when the signal to be calibrated is a single discrete signal, the target calibration parameter is a calibration parameter tailored based on the single discrete signal. When the signal to be calibrated is a discrete signal stream consisting of a plurality of discrete signals, the target calibration parameter includes a plurality of calibration parameters tailored based on signals included in the discrete signal stream.

In some embodiments of the disclosure, the terminal may convolve the signal to be calibrated and the target calibration parameter to obtain a plurality of convolution results, so as to obtain the calibrated signal.

In some embodiments of the disclosure, when the signal to be calibrated contains only one signal and the target calibration parameter is a calibration parameter corresponding to the signal to be calibrated, each signal point in the signal to be calibrated is convolved with the target calibration parameter, to obtain a respective convolution result of each signal point and the target calibration parameter. The above-mentioned terminal may determine the convolution results as the calibrated signal.

In detail, in some embodiments of the disclosure, when the signal to be calibrated is a signal stream consisting of a plurality of signals and the target calibration parameter includes calibration parameters corresponding to the plurality of signals in the signal to be calibrated, the signal to be calibrated is convolved with the target calibration parameter separately, and the convolution results of the plurality of signals can be obtained. The above-mentioned terminal can determine all the plurality of convolution results as the calibrated signal.

For example, as illustrated in FIG. 4, an equalization filter 409 receives the target calibration parameter generated by the down sampling module as the filter parameter of the equalization filter. Meanwhile, the signal to be calibrated that is converted by an ADC 408 is received, and the signal is convolved and computed to obtain the calibrated signal.

It is understandable that the method for calibrating a signal according to embodiments of the disclosure may include at least one of blocks 701 to 703. For example, the block 701 may be implemented as a stand-alone embodiment or the block 703 may be implemented as a stand-alone embodiment, which is not used to limit the disclosure.

In this implementation or embodiment, the blocks may be implemented independently, exchangeably, or in any combination, and the implementations or embodiments may be implemented in any combination or may be implemented in combination with other implementations or embodiments, without conflict.

With the method for calibrating a signal according to the disclosure, the intermediate calibration parameter is obtained by adjusting, based on the frequency deviation and the first sampling rate, the calibration parameter; the target calibration parameter is obtained by adjusting, using the frequency deviation and the second sampling rate, the intermediate calibration parameter; and the calibrated signal is obtained by calibrating, using the target calibration parameter, the signal to be calibrated. The solution of the disclosure obtains the target calibration parameter by adjusting the calibration parameter using the frequency deviation, the first sampling rate, and the second sampling rate, to tailor the respective target calibration parameters for different signals to be calibrated, thereby avoiding dynamic adaptation while realizing dimension reduction of parameter storage. Meanwhile, the target calibration parameter can be used to calibrate any signal to be calibrated in the entire frequency band.

Figure 8:
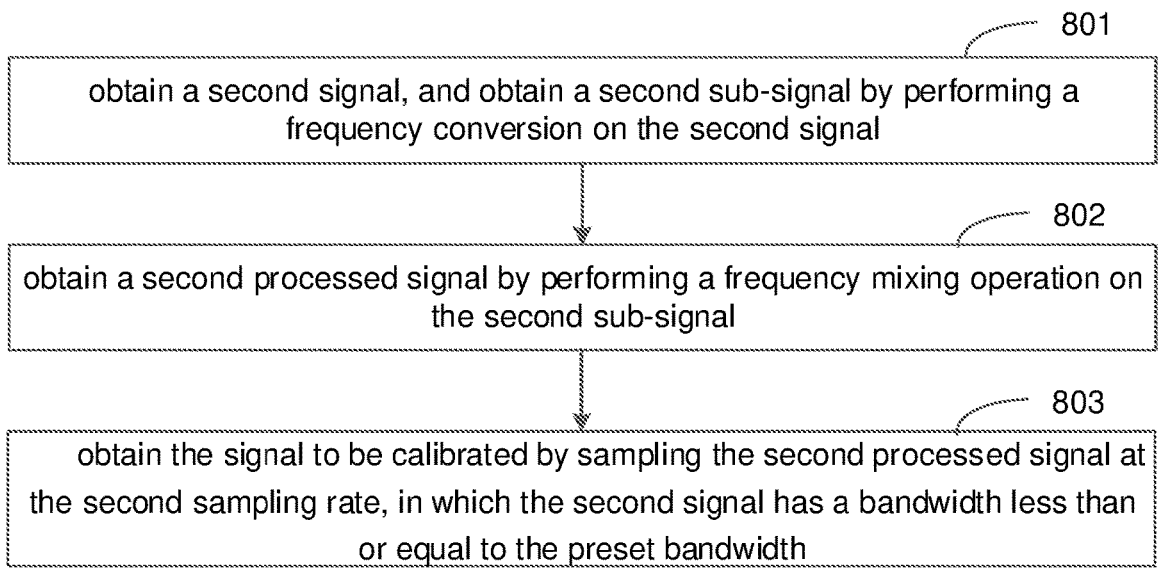
FIG. 8 is a flowchart illustrating a method for calibrating a signal according to an embodiment of the disclosure.

FIG. 8 is a flowchart illustrating a method for calibrating a signal according to an embodiment of the disclosure.

At block 801, a second signal is obtained, and a second sub-signal is obtained by performing a frequency conversion on the second signal.

In some embodiments of the disclosure, the terminal may obtain the second signal and perform the frequency conversion on the second signal to obtain the second sub-signal.

In some embodiments of the disclosure, the second signal may be a single signal or a signal stream consisting of a plurality of signals, which is not limited in the disclosure.

In some embodiments of the disclosure, the method for obtaining the second signal is not limited in the disclosure. For example, the second signal is obtained by receiving an operating signal sent by another communication device.

In some embodiments of the disclosure, when the second signal is a transmitting signal, the up conversion is performed, with a second frequency, on the second signal.

In some embodiments of the disclosure, when the second signal is a receiving signal, a down conversion is performed, with a second frequency, on the second signal.

In some embodiments of the disclosure, the second signal satisfies the following equation:

$$f_0 - BW_{cal}/2 \le f_1 \pm BW/2 \le f_0 + BW_{cal}/2 \qquad (8.1)$$

in which, $f_1$ denotes a frequency of the frequency conversion performed on the second signal, BW denotes the bandwidth of the second signal, $f_0$ denotes a frequency of the frequency conversion on the signal having the preset bandwidth, and $BW_{cal}$ denotes the preset bandwidth.

In some embodiments of the disclosure, the preset bandwidth satisfies one of the following conditions: the preset bandwidth including 400 Mhz; the preset bandwidth including 200 Mhz; or the preset bandwidth occupying the entire used frequency band.

In this embodiment, the detailed steps for performing the frequency conversion on the second signal can be referred to the relevant embodiments of the block 502 illustrated in FIG. 5, which are not repeated herein.

At block 802, a second processed signal is obtained by performing a frequency mixing operation on the second sub-signal.

In some embodiments of the disclosure, the terminal may perform the frequency mixing operation on the second sub-signal to obtain the second processed signal.

In some embodiments of the disclosure, the unevenness of the RF communication circuit and the inter-code crosstalk during signal transmission may create a certain degree of distortion in the second processed signal obtained by performing the frequency mixing operation. That is, the second processed signal may be a distorted signal obtained by performing the frequency conversion and frequency mixing operation on the second sub-signal.

The detailed steps of performing the frequency mixing operation on the second signal in this embodiment can be referred to the relevant embodiment of the block 503 illustrated in FIG. 5, which are not repeated here.

For example, as illustrated in FIG. 4, the acquired second signal may be a narrowband signal 407 having a bandwidth less than or equal to the preset bandwidth, and the terminal may feed the narrowband signal into the RF communication circuit 402, the frequency conversion is performed on the narrowband signal to obtain the second sub-signal and the frequency mixing operation is performed on the second sub-signal to obtain the second processed signal.

At block 803, the signal to be calibrated is obtained by sampling the second processed signal at the second sampling rate, in which the second signal has a bandwidth less than or equal to the preset bandwidth.

In some embodiments of the disclosure, the terminal may sample the second processed signal at the second sampling rate to obtain the signal to be calibrated. The second signal has a bandwidth less than or equal to the preset bandwidth.

In some embodiments of the disclosure, the second processed signal is a continuous signal that needs to be discretely sampled and converted into a digital baseband signal, i.e., the signal to be calibrated.

In this embodiment, the detailed steps of sampling the second processed signal at the second sampling rate may be referred to the relevant embodiment of the block 303 illustrated in FIG. 3, which are not repeated herein.

For example, as illustrated in FIG. 4, the RF communication circuit 402 may feed the second processed signal into the ADC 408, the second processed signal is sampled, and the second processed signal is converted from a continuous signal to a discrete signal, so as to obtain the signal to be calibrated.

With the method for calibrating a signal according to the disclosure, the second signal is obtained, a second sub-signal is obtained by performing the frequency conversion on the second signal; a second processed signal is obtained by performing the frequency mixing operation on the second sub-signal; and the signal to be calibrated is obtained by sampling the second processed signal at the second sampling rate, in which the second signal has a bandwidth less than or equal to the preset bandwidth. In the solution of the disclosure, the processing of the signal having the preset bandwidth in the RF communication circuit is classified into the frequency conversion and the frequency mixing, the second processed signal obtained by the RF communication circuit is determined, and the second processed signal is sampled to obtain the signal to be calibrated, thereby improving the accuracy of the signal calibration by taking into account the effect of the sampling rate on the signal calibration.

In embodiments of FIG. 4, the method for calibrating a signal according to the disclosure can be divided into two stages. The first stage is a calibration stage, and its operation process is from the block 401 to the block 404, in which the wideband signal spectrum used in the block 401 occupies the entire signal frequency band, so the bandwidth of the wideband signal is greater than or equal to the bandwidth of the narrowband bias signal. The second stage is the equalization stage, and its operation process includes the block 402, and the blocks 405 to 409. By tailoring the corresponding calibration parameters for different signals based on the carrier frequency and sampling ratio of the narrowband bias signal, the calibrated signal is obtained based on the sampled and digital signal to be calibrated and the target calibration parameter, thereby avoiding dynamic adaptation while realizing dimension reduction of parameter storage.

Figure 9:
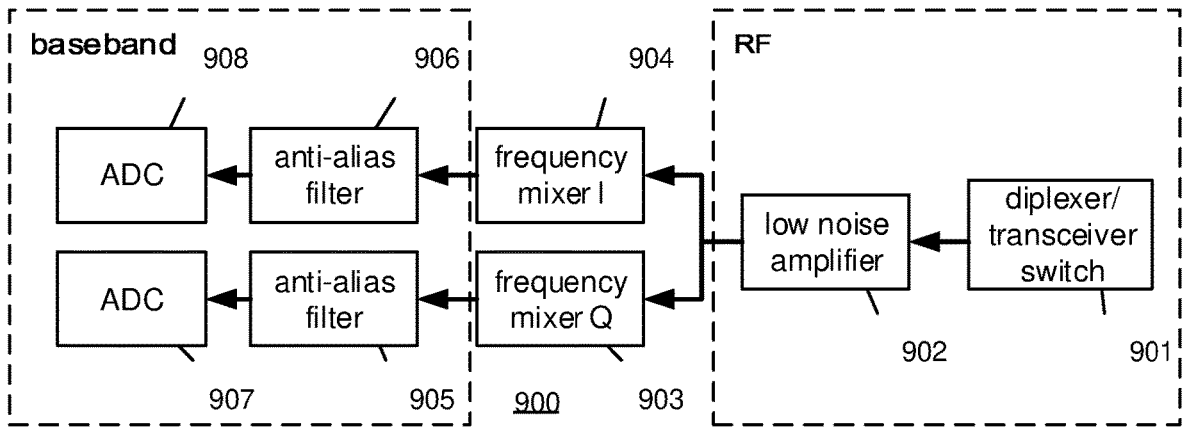
FIG. 9 is a diagram illustrating a structure for performing a method for calibrating a signal according to an embodiment of the disclosure.

FIG. 9 is a block diagram illustrating a circuit structure 900 for performing a method for calibrating a signal according to an embodiment of the disclosure.

The circuit structure 900 includes a RF portion and a baseband portion.

The RF portion includes a diplexer/transceiver switch 901, a low noise amplifier 902, and the baseband portion includes an anti-alias filter 905 (and anti-alias filter 906) and an ADC 907 (and ADC 908).

The RF signal is transferred to the baseband portion after passing through the diplexer/transceiver switch 901, the low noise amplifier 902, and the frequency mixer 903 and the frequency mixer 904), and is converted to a digital signal after passing through the anti-alias filter 905 (and the anti-alias filter 906) and the ADC 907 (and the ADC 908).

Since the duplexer/transceiver switch 901 and the low noise amplifier 902 are not ideal devices, they may cause the unevenness characteristic of this receiving channel in the RF frequency band. The anti-alias filter 905, the anti-alias filter 906, and the ADC 907, and the ADC 908 may cause the unevenness characteristic of this receiving channel in the baseband.

Figures 10, 11:
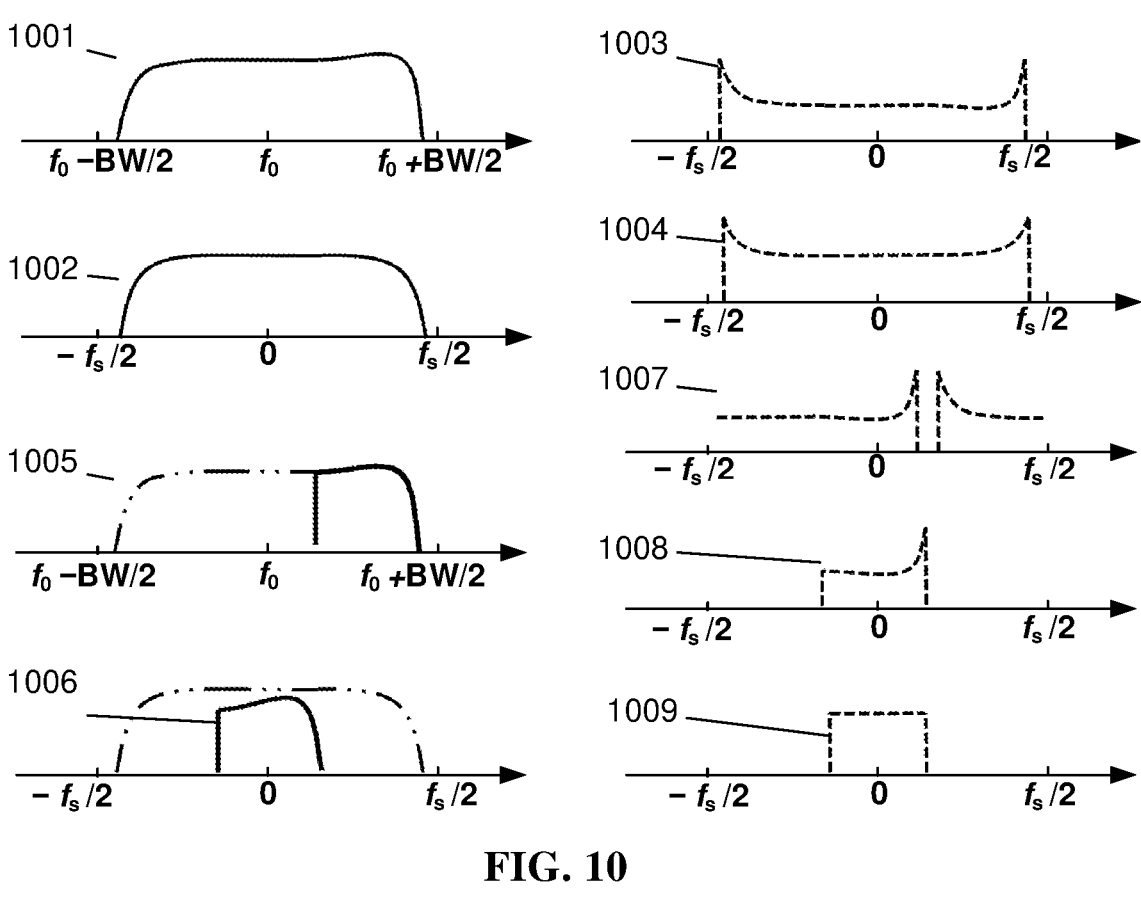
FIG. 10 is a frequency domain diagram of an example of a method for calibrating a signal according to an embodiment of the disclosure.
FIG. 11 is a block diagram illustrating an apparatus for calibrating a signal according to an embodiment of the disclosure.

FIG. 10 is a diagram illustrating a signal spectrum when performing a method for calibrating a signal based on the circuit structure of FIG. 9 according to the disclosure.

When the second signal enters the circuit structure illustrated in FIG. 9, the second signal first passes through the RF portion, and the unevenness of the RF portion is shown in 1005, and then the second signal is modulated to the baseband portion, the baseband unevenness of the baseband portion is shown in 1006.

Specifically, a flatter frequency band of the frequency mixer 903 is selected, and the signal having the preset bandwidth is fed directly into the frequency mixer 903\the frequency mixer 904 and passes through the anti-alias filter 905\the anti-alias filter 906 and the ADC 907\the ADC 908, to obtain the first digital signal of the baseband. This signal is fed into the equalization calibration module (e.g., 404 in FIG. 4), and the parameter to be calibrated is obtained based on the signal having the preset bandwidth and the first digital signal of the baseband, the spectral unevenness of this baseband channel is shown in 1002, and the frequency domain distribution of a compensation parameter is shown in 1004.

Next, the signal having the preset bandwidth is fed into the RF receiving channel through the diplexer/transceiver switch 901, the signal passes through the low noise amplifier 902, the frequency mixer 903\the frequency mixer 904, the anti-alias filter 905\the anti-alias filter 906, and the ADC 907\the ADC 908 to obtain the first digital signal. This signal is corrected based on the above parameter to be calibrated, to obtain a first RF digital signal that is only affected by RF unevenness. The signal is fed into the equalization calibration module, to obtain the corresponding RF calibration parameter based on the signal having the preset bandwidth and the first RF digital signal. The spectral unevenness of the RF channel is shown in 1001, and the frequency response curve of compensation parameters is shown in 1003.

Therefore, the calibration parameter of the baseband side and the calibration parameter of the RF side are obtained respectively. In the operating state, the second signal is input to the NCO, and the NCO performs spectral shifting of the RF calibration parameter based on the bias frequency, and the frequency response characteristics of the shifted RF calibration parameter are shown in 1007. Since the sampling rate of analog-to-digital conversion is changed, the shifted RF calibration parameter is shifted and tailored accordingly, to obtain the RF target calibration parameter obtained after tailoring, and the frequency response of the RF target calibration parameter is shown in 1008. Similarly, the baseband target calibration parameter can be obtained, and the frequency response of the baseband target calibration parameter is shown in 1009. Finally, the second signal is sequentially fed to an equalizer (e.g., 409 in FIG. 4) using the baseband target calibration parameter and an equalizer using the RF target calibration parameter, to obtain an output signal compensating for the unevenness characteristic of the channel, i.e., the calibrated signal in above embodiments.

With the method for calibrating a signal according to the disclosure, the calibration parameter corresponding to the signal having the preset bandwidth is generated and the calibrated signal is obtained by calibrating the signal to be calibrated based on the frequency of the signal to be calibrated and the calibration parameter. The solution of the disclosure can use the generated calibration parameter to calibrate different signals to be calibrated, thereby avoiding dynamic adaptation while realizing dimension reduction of parameter storage.

Therefore, this solution has the following beneficial effects.

Uniform calibration parameter is generated for signals having different sampling rates and modulation frequencies, and the respective target calibration parameters are tailored for different signals, which avoids dynamic adaptation and high-dimensional parameter storage while keeping the equalization performance unrestricted.

FIG. 11 is a structural diagram illustrating an apparatus 1100 for calibrating a signal according to an embodiment of the disclosure. The apparatus includes: a calibration parameter generating module 1101 and a signal calibrating module 1102.

The calibration parameter generating module 1101 is configured to generate a calibration parameter corresponding to a signal having a preset bandwidth.

The signal calibrating module 1102 is configured to obtain a calibrated signal by calibrating, based on a frequency of a signal to be calibrated and the calibration parameter, the signal to be calibrated.

In some embodiments of the disclosure, the calibration parameter generating module 1101 is further configured to: determine a first signal by performing a frequency conversion on the signal having the preset bandwidth; obtain a first digital signal by sampling the first signal; and determine the calibration parameter based on the first digital signal and the signal having the preset bandwidth.

In some embodiments of the disclosure, the calibration parameter generating module 1101 is further configured to: obtain a first sub-signal by performing a frequency conversion on the signal having the preset bandwidth; and obtain the first signal by performing a frequency mixing operation on the first sub-signal.

In some embodiments of the disclosure, the calibration parameter generating module 1101 is further configured to: perform, with a first frequency, an up conversion on the signal having the preset bandwidth, in response to the signal having the preset bandwidth being a transmitting signal; and perform, with a first frequency, a down conversion on the signal having the preset bandwidth, in response to the signal having the preset bandwidth being a receiving signal.

In some embodiments of the disclosure, the calibration parameter generating module 1101 is further configured to: determine a first frequency corresponding to the signal having the preset bandwidth, in which the first frequency is used in performing the frequency conversion on the signal having the preset bandwidth.

In some embodiments of the disclosure, the calibration parameter generating module 1101 is further configured to: determine a first sampling rate corresponding to the signal having the preset bandwidth, in which the first sampling rate is used for sampling a signal obtained by performing the frequency conversion on the signal having the preset bandwidth.

In some embodiments of the disclosure, the signal calibrating module 1102 is further configured to: obtain the calibrated signal by calibrating, using the calibration parameter and a frequency deviation between the first frequency and the frequency of the signal to be calibrated, the signal to be calibrated.

In some embodiments of the disclosure, the signal calibrating module 1102 is further configured to: obtain the calibrated signal by calibrating, using the frequency deviation between the first frequency and the frequency of the signal to be calibrated, the first sampling rate, a second sampling rate and the calibration parameter, the signal to be calibrated, in which the second sampling rate corresponds to the signal to be calibrated.

In some embodiments of the disclosure, the signal calibrating module 1102 is further configured to: obtain an intermediate calibration parameter by adjusting, based on the frequency deviation and the first sampling rate, the calibration parameter; obtain a target calibration parameter by adjusting, using the frequency deviation and the second sampling rate, the intermediate calibration parameter; and obtain the calibrated signal by calibrating, using the target calibration parameter, the signal to be calibrated.

In some embodiments of the disclosure, the signal calibrating module 1102 is further configured to: obtain a second signal, and obtain a second sub-signal by performing a frequency conversion on the second signal; obtain a second processed signal by performing a frequency mixing operation on the second sub-signal; and obtain the signal to be calibrated by sampling the second processed signal at the second sampling rate, in which the second signal has a bandwidth less than or equal to the preset bandwidth.

In some embodiments of the disclosure, the second signal satisfies a following condition:

$$f_0 - BW_{cal}/2 \leq f_1 \pm BW/2 \leq f_0 + BW_{cal}/2$$

in which, $f_1$ denotes a frequency of the frequency conversion performed on the second signal, BW denotes the bandwidth of the second signal, $f_0$ denotes a frequency of the frequency conversion performed on the signal having the preset bandwidth, and $BW_{cal}$ denotes the preset bandwidth.

In some embodiments of the disclosure, the preset bandwidth satisfies one of: the preset bandwidth including 400 Mhz; the preset bandwidth including 200 Mhz; or the preset bandwidth occupying an entire used frequency band.

Figure 12:
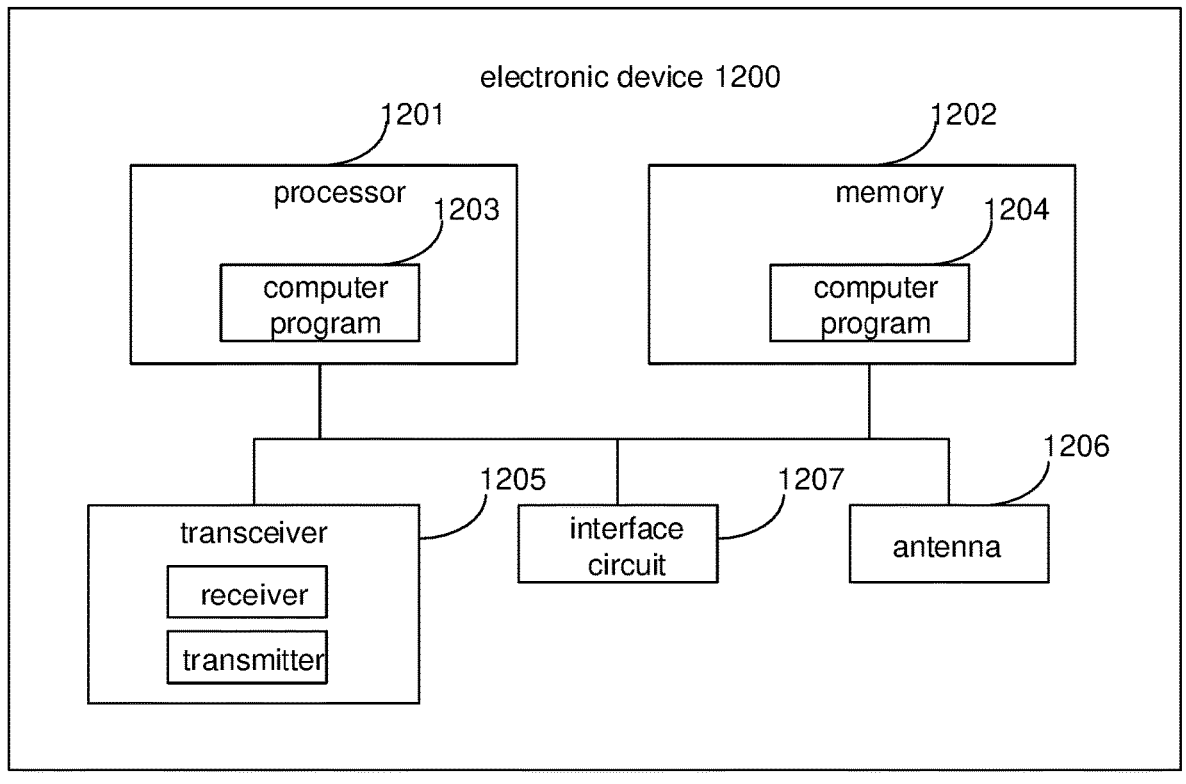
FIG. 12 is a schematic diagram illustrating an electronic device according to an embodiment of the disclosure.

FIG. 12 is a schematic diagram illustrating an electronic device 1200 according to an embodiment of the disclosure. The electronic device 1200 may be a network device or a terminal device, or may be a chip, a chip system or a processor that supports the network device to realize the above-described method, or may be a chip, a chip system or a processor that supports the terminal device to realize the above-described method. The device may be used to realize the method described in the above method embodiments with reference to the description of the above-described method embodiments.

The electronic device 1200 may include one or more processors 1201. The processor 1201 may be a general purpose processor or a dedicated processor, such as, a baseband processor and a central processor. The baseband processor is used for processing communication protocols and communication data. The central processor is used for controlling the electronic device (e.g., a base station, a baseband chip, a terminal device, a terminal device chip, a central unit (CU) or a distributed unit (DU)), executing computer programs, and processing data of the computer programs.

In some examples, the electronic device 1200 may include one or more memories 1202 on which computer programs 1204 may be stored. The processor 1201 executes the computer programs 1204 to cause the electronic device 1200 to perform the method described in the above method embodiments. In some examples, the memory 1202 may also store data. The electronic device 1200 and the memory 1202 may be provided separately or may be integrated together.

In some examples, the electronic device 1200 may also include a transceiver 1205 and an antenna 1206. The transceiver 1205 may be referred to as a transceiver unit, a transceiver machine, or a transceiver circuit, for realizing a transceiver function. The transceiver 1205 may include a receiver and a transmitter. The receiver may be referred to as a receiving machine or a receiving circuit, for realizing the receiving function. The transmitter may be referred to as a transmitter machine or a transmitting circuit, for realizing the transmitting function.

In some examples, the electronic device 1200 may also include one or more interface circuits 1207. The interface circuits 1207 are used to receive code instructions and transmit them to the processor 1201. The processor 1201 runs the code instructions to cause the electronic device 1200 to perform the method described in the method embodiments.

In an implementation, the processor 1201 may include a transceiver for implementing the receiving and sending functions. The transceiver may be, for example, a transceiver circuit, an interface, or an interface circuit. The transceiver circuit, the interface, or the interface circuit for implementing the receiving and sending functions may be separated or may be integrated together. The transceiver circuit, the interface, or the interface circuit described above may be used for reading and writing code/data, or may be used for signal transmission or delivery.

In an implementation, the processor 1201 may store a computer program 1203. When the computer program 1203 runs on the processor 1201, the electronic device 1200 is caused to perform the method described in the method embodiments above. The computer program 1203 may be solidified in the processor 1201, and in such case the processor 1201 may be implemented by hardware.

In an implementation, the electronic device 1200 may include circuits. The circuits may implement the sending, receiving or communicating function in the preceding method embodiments. The processor and the transceiver described in this disclosure may be implemented on integrated circuits (ICs), analog ICs, RF integrated circuits (RFICs), mixed signal ICs, application specific integrated circuits (ASICs), printed circuit boards (PCBs), and electronic devices. The processor and the transceiver can also be produced using various IC process technologies, such as complementary metal oxide semiconductor (CMOS), nMetal-oxide-semiconductor (NMOS), positive channel metal oxide semiconductor (PMOS), bipolar junction transistor (BJT), bipolar CMOS (BiCMOS), silicon-germanium (SiGe), gallium arsenide (GaAs) and so on.

The electronic device in the description of the above embodiments may be a network device or a terminal device, but the scope of the electronic device described in the disclosure is not limited thereto, and the structure of the electronic device may not be limited by FIG. 12. The electronic device may be a stand-alone device or may be part of a larger device. For example, the described communication device may be:

(1) a stand-alone IC, a chip, a chip system or a subsystem;

(2) a collection of ICs including one or more ICs. In some examples, the collection of ICs may also include storage components for storing data and computer programs;

(3) an ASIC, such as a modem;

(4) a module that can be embedded within other devices;

(5) a receiver, a terminal device, a smart terminal device, a cellular phone, a wireless device, a handheld machine, a mobile unit, an in-vehicle device, a network device, a cloud device, an artificial intelligence device, and the like; and (6) others.

Figure 13:
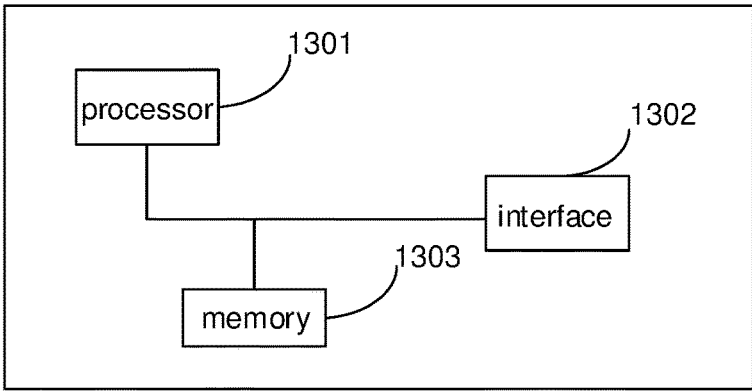
FIG. 13 is a schematic diagram illustrating a chip according to an embodiment of the disclosure.

The case where the electronic device may be a chip or a chip system is described with reference to the schematic structure of the chip shown in FIG. 13.

The embodiments of the disclosure also provide a chip. The chip shown in FIG. 13 includes a processor 1301 and an interface 1302. There may be one or more processors 1301, and there may be multiple interfaces 1302.

In some examples, the chip further includes a memory 1303 used to store necessary computer programs and data.

The embodiments of the disclosure also provide a non-transitory computer-readable storage medium having computer instructions stored thereon. The computer instructions are used to cause a computer to perform the method described in the above embodiments of the disclosure.

It is understood by those skilled in the art that various illustrative logical blocks and steps listed in the embodiments of the disclosure may be implemented by electronic hardware, computer software, or a combination of both. Whether such function is implemented by hardware or software depends on the particular application and the design requirements of the entire system. Those skilled in the art may, for each particular application, use various methods to implement the described function, but such implementation should not be understood as beyond the scope of protection of the embodiments of the disclosure.

It should be noted that the terms "first", "second", and the like in the specification and claims of the disclosure and the accompanying drawings described above are used to distinguish similar objects and not used to describe a particular order or sequence. It should be understood that data so used may be interchanged in appropriate cases, so that the embodiments of the disclosure described herein can be implemented in an order other than those illustrated or described herein. The implementations described in following embodiments do not represent all implementations consistent with the disclosure. Instead, they are only examples of devices and methods consistent with some aspects of the disclosure as described in detail in the appended claims.

Reference throughout this specification to "an embodiment," "some embodiments," "an example," "a specific example," or "some examples," means that a particular feature, structure, material, or characteristic described in combination with the embodiment or example is included in at least one embodiment or example of the disclosure. The appearances of the above phrases in various places throughout this specification are not necessarily referring to the same embodiment or example of the disclosure. Furthermore, the particular features, structures, materials, or characteristics may be combined in any suitable manner in one or more embodiments or examples.

Any process or method described in a flowchart or described herein in other ways may be understood to include one or more modules, segments or portions of codes of executable instructions for achieving specific logical functions or steps in the process, and the scope of a preferred embodiment of the disclosure includes other implementations, which should be understood by those skilled in the art.

The logic and/or step described in other manners herein or shown in the flowchart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples (non-exclusive list) of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

In addition, individual functional units in the embodiments of the disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium. The storage medium mentioned above may be a ROM, a disk or CD-ROM.

Although embodiments of disclosure have been shown and described above, it should be understood that above embodiments are just explanatory, and cannot be construed to limit the disclosure, for those skilled in the art, changes, alternatives, and modifications can be made to the embodiments without departing from spirit, principles and scope of the disclosure.

What is claimed is:

1. A method for calibrating a signal, comprising:
obtaining a calibration parameter corresponding to a signal having a preset bandwidth;
determining a first frequency corresponding to the signal having the preset bandwidth, wherein the first frequency is used in performing a frequency conversion on the signal having the preset bandwidth;
determining a first sampling rate corresponding to the signal having the preset bandwidth, wherein the first sampling rate is used for sampling a frequency-converted signal obtained by performing the frequency conversion on the signal having the preset bandwidth; and
obtaining a calibrated signal by calibrating, using the calibration parameter, a frequency deviation between the first frequency and a frequency of a signal to be calibrated, the first sampling rate, and a second sampling rate, the signal to be calibrated, wherein the second sampling rate corresponds to the signal to be calibrated;
wherein obtaining a calibrated signal by calibrating, using the calibration parameter, a frequency deviation between the first frequency and a frequency of a signal to be calibrated, the first sampling rate, and a second sampling rate, the signal to be calibrate comprises:
obtaining an intermediate calibration parameter by adjusting, based on the frequency deviation and the first sampling rate, the calibration parameter;

obtaining a target calibration parameter by adjusting, using the frequency deviation and the second sampling rate, the intermediate calibration parameter; and
obtaining the calibrated signal by calibrating, using the target calibration parameter, the signal to be calibrated.

2. The method of claim 1, wherein the obtaining the calibration parameter corresponding to the signal having the preset bandwidth comprises:
determining a first signal by performing a frequency conversion on the signal having the preset bandwidth;
obtaining a first digital signal by sampling the first signal; and
determining the calibration parameter based on the first digital signal and the signal having the preset bandwidth.

3. The method of claim 2, wherein the determining the first signal by performing the frequency conversion on the signal having the preset bandwidth comprises:
obtaining a first sub-signal by performing the frequency conversion on the signal having the preset bandwidth; and
obtaining the first signal by performing a frequency mixing operation on the first sub-signal.

4. The method of claim 2, wherein the performing the frequency conversion on the signal having the preset bandwidth comprises one of:
performing, with the first frequency, an up conversion on the signal having the preset bandwidth, in response to the signal having the preset bandwidth being a transmitting signal; or
performing, with the first frequency, a down conversion on the signal having the preset bandwidth, in response to the signal having the preset bandwidth being a receiving signal.

5. The method of claim 1, further comprising:
obtaining a second signal, and obtaining a second sub-signal by performing a frequency conversion on the second signal;
obtaining a second processed signal by performing a frequency mixing operation on the second sub-signal; and
obtaining the signal to be calibrated by sampling the second processed signal at the second sampling rate, wherein the second signal has a bandwidth less than or equal to the preset bandwidth.

6. The method of claim 5, wherein the second signal satisfies a following condition:

$$f_0 - BW_{cal}/2 \le f_1 \pm BW/2 \le f_0 + BW_{cal}/2,$$

wherein f1 denotes a frequency of the frequency conversion performed on the second signal, BW denotes a bandwidth of the second signal, f0 denotes a frequency of the frequency conversion performed on the signal having the preset bandwidth, and $BW_{cal}$ denotes the preset bandwidth.

7. The method of claim 1, wherein the preset bandwidth satisfies one of:
the preset bandwidth comprising 400 Mhz;
the preset bandwidth comprising 200 Mhz;
the preset bandwidth being greater than or equal to 200 Mhz and less than or equal to 400 Mhz; or the preset bandwidth occupying an entire used frequency band.

8. An electronic device, comprising a processor and a memory having instructions stored thereon, wherein when the instructions are executed by the processor, the processor is configured to:

obtain a calibration parameter corresponding to a signal having a preset bandwidth;

determine a first frequency corresponding to the signal having the preset bandwidth, wherein the first frequency is used in performing a frequency conversion on the signal having the preset bandwidth;

determine a first sampling rate corresponding to the signal having the preset bandwidth, wherein the first sampling rate is used for sampling a frequency-converted signal obtained by performing the frequency conversion on the signal having the preset bandwidth; and obtain a calibrated signal by calibrating, using the calibration parameter, a frequency deviation between the first frequency and a frequency of the signal to be calibrated, the first sampling rate, and a second sampling rate, the signal to be calibrated;

wherein the second sampling rate corresponds to the signal to be calibrated; and obtain an intermediate calibration parameter by adjusting, based on the frequency deviation and the first sampling rate, the calibration parameter;

obtain a target calibration parameter by adjusting, using the frequency deviation and the second sampling rate, the intermediate calibration parameter; and obtain the calibrated signal by calibrating, using the target calibration parameter, the signal to be calibrated.

9. The electronic device of claim 8, wherein the processor is configured to:

determine a first signal by performing a frequency conversion on the signal having the preset bandwidth;

obtain a first digital signal by sampling the first signal; and determine the calibration parameter based on the first digital signal and the signal having the preset bandwidth.

10. The electronic device of claim 9, wherein the processor is configured to:

obtain a first sub-signal by performing the frequency conversion on the signal having the preset bandwidth; and obtain the first signal by performing a frequency mixing operation on the first sub-signal.

11. The electronic device of claim 9, wherein the processor is configured to perform one of:

performing, with the first frequency, an up conversion on the signal having the preset bandwidth, in response to the signal having the preset bandwidth being a transmitting signal; or performing, with the first frequency, a down conversion on the signal having the preset bandwidth, in response to the signal having the preset bandwidth being a receiving signal.

12. The electronic device of claim 8, wherein the processor is further configured to:

obtain a second signal, and obtain a second sub-signal by performing a frequency conversion on the second signal;

obtain a second processed signal by performing a frequency mixing operation on the second sub-signal; and obtain the signal to be calibrated by sampling the second processed signal at the second sampling rate, wherein the second signal has a bandwidth less than or equal to the preset bandwidth.

13. The electronic device of claim 12, wherein the second signal satisfies a following condition:

$$f_0 - BW_{cal}/2 \le f_1 \pm BW/2 \le f_0 + BW_{cal}/2,$$

wherein f1 denotes a frequency of the frequency conversion performed on the second signal, BW denotes a bandwidth of the second signal, f0 denotes a frequency of the frequency conversion performed on the signal having the preset bandwidth, and $BW_{cal}$ denotes the preset bandwidth.

14. A non-transitory computer-readable storage medium, having computer instructions stored thereon, wherein the computer instructions are configured to cause a computer to perform a method for calibrating a signal, wherein the method comprises:

obtaining a calibration parameter corresponding to a signal having a preset bandwidth; and determining a first frequency corresponding to the signal having the preset bandwidth, wherein the first frequency is used in performing a frequency conversion on the signal having the preset bandwidth;

determining a first sampling rate corresponding to the signal having the preset bandwidth, wherein the first sampling rate is used for sampling a frequency-converted signal obtained by performing the frequency conversion on the signal having the preset bandwidth; and obtaining a calibrated signal by calibrating, using the calibration parameter, a frequency deviation between the first frequency and a frequency of the signal to be calibrated, the first sampling rate, and a second sampling rate, the signal to be calibrated wherein the second sampling rate corresponds to the signal to be calibrated;

wherein obtaining a calibrated signal by calibrating, using the calibration parameter, a frequency deviation between the first frequency and a frequency of the signal to be calibrated, the first sampling rate, and a second sampling rate, the signal to be calibrate comprises:

obtaining an intermediate calibration parameter by adjusting, based on the frequency deviation and the first sampling rate, the calibration parameter;

obtaining a target calibration parameter by adjusting, using the frequency deviation and the second sampling rate, the intermediate calibration parameter; and obtaining the calibrated signal by calibrating, using the target calibration parameter, the signal to be calibrated.

* * * * *